Jan. 17, 1933.  L. B. NEIGHBOUR  1,894,412
STALK SHREDDING IMPLEMENT
Filed June 13, 1928  4 Sheets-Sheet 1
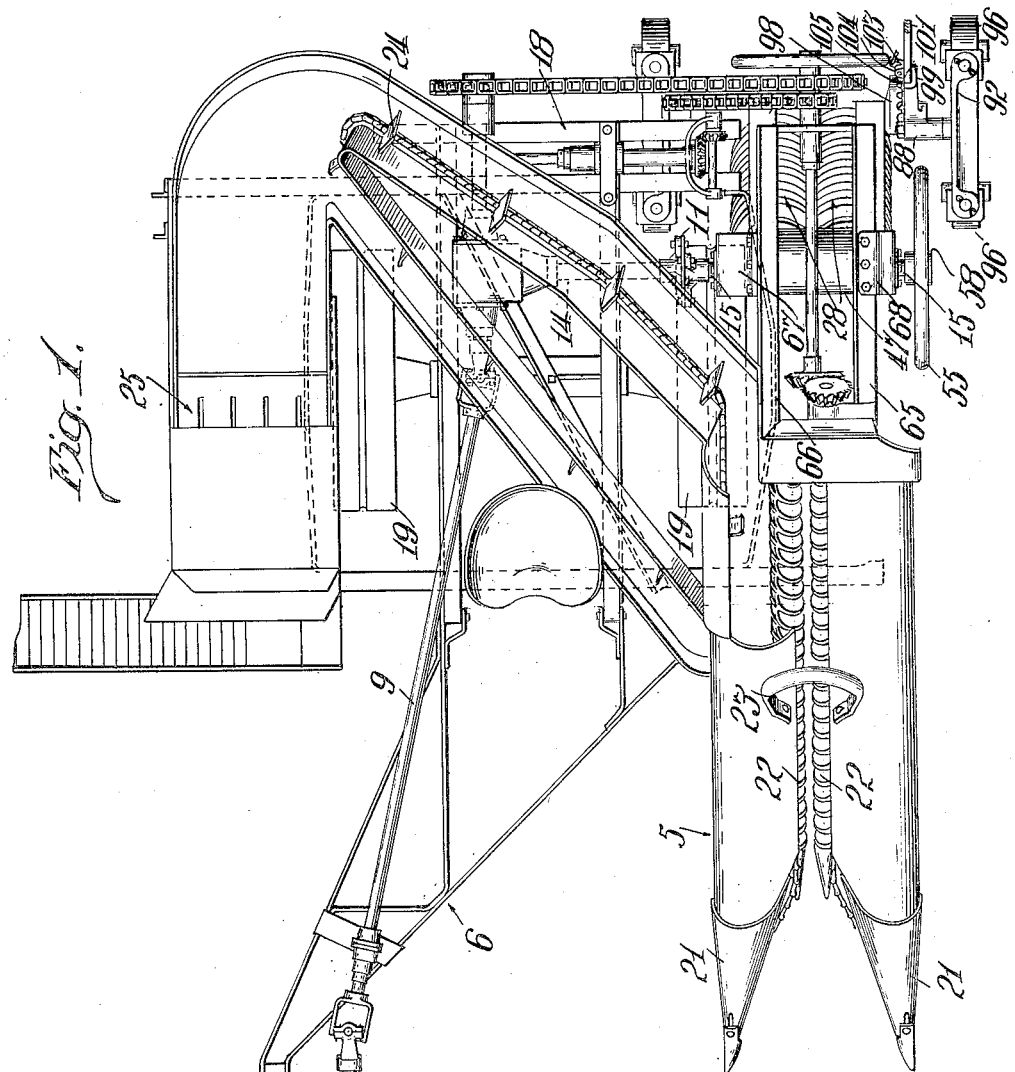
Fig. 1.
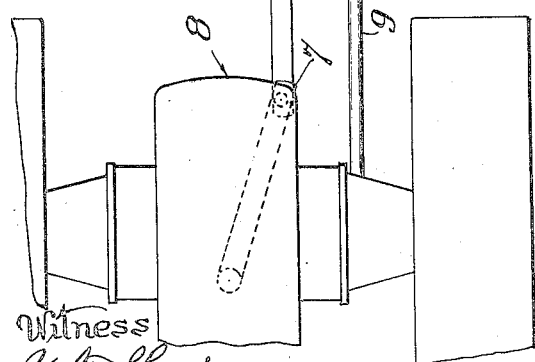
Witness
Milton Lenoir
Inventor:
Leonard B. Neighbour
By Brown, Jackson, Boettcher & Dienner
Attorneys

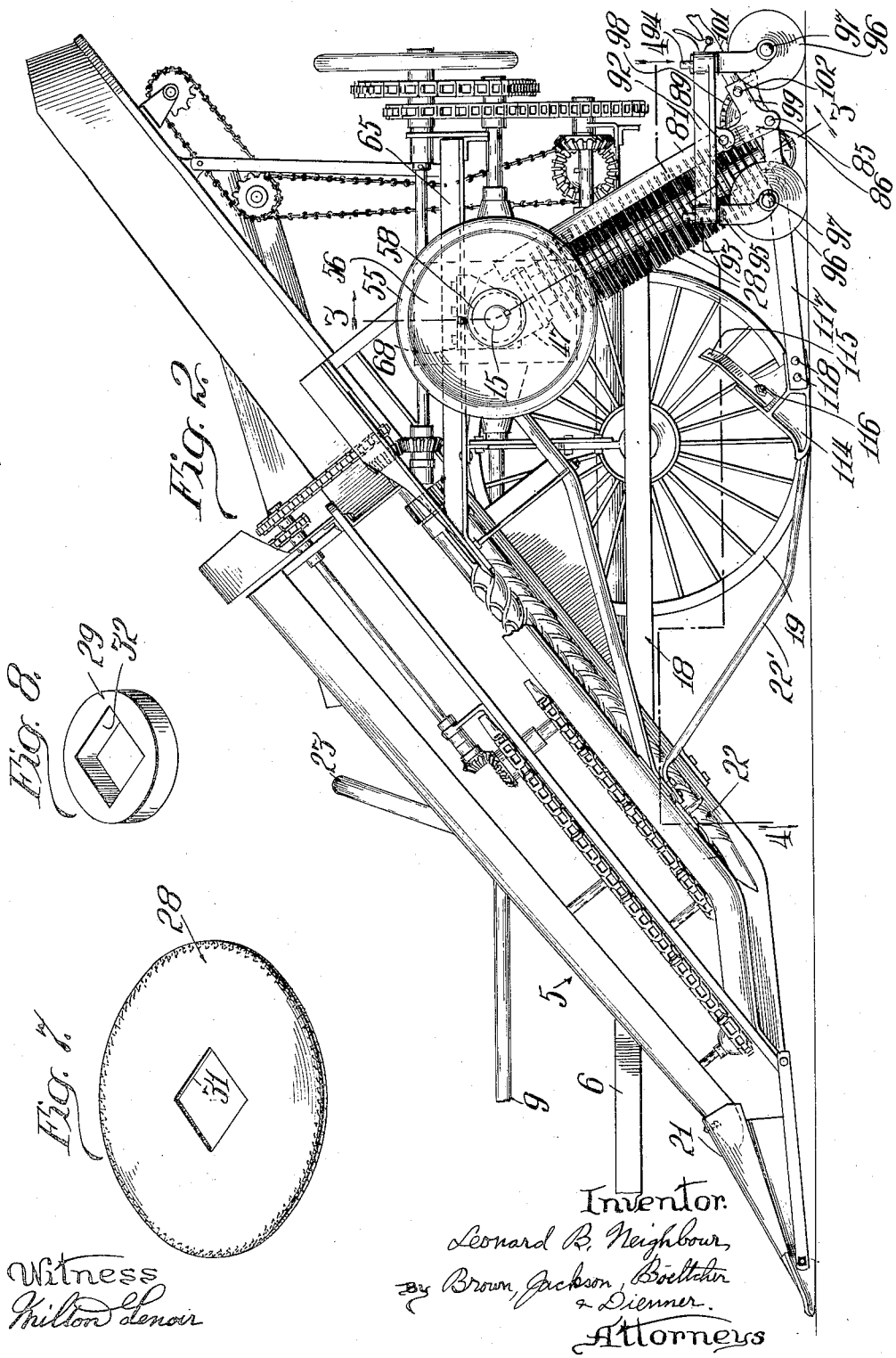

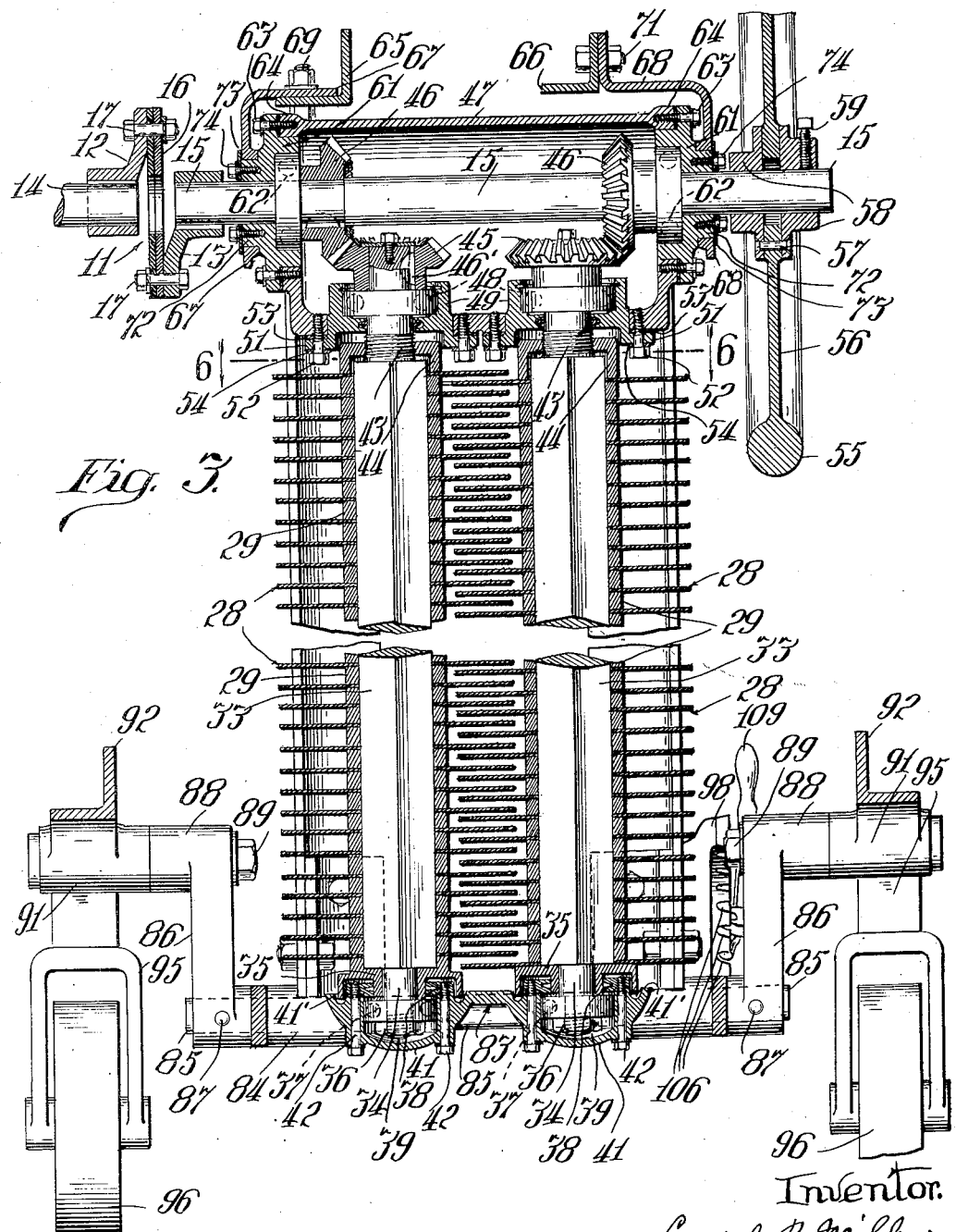

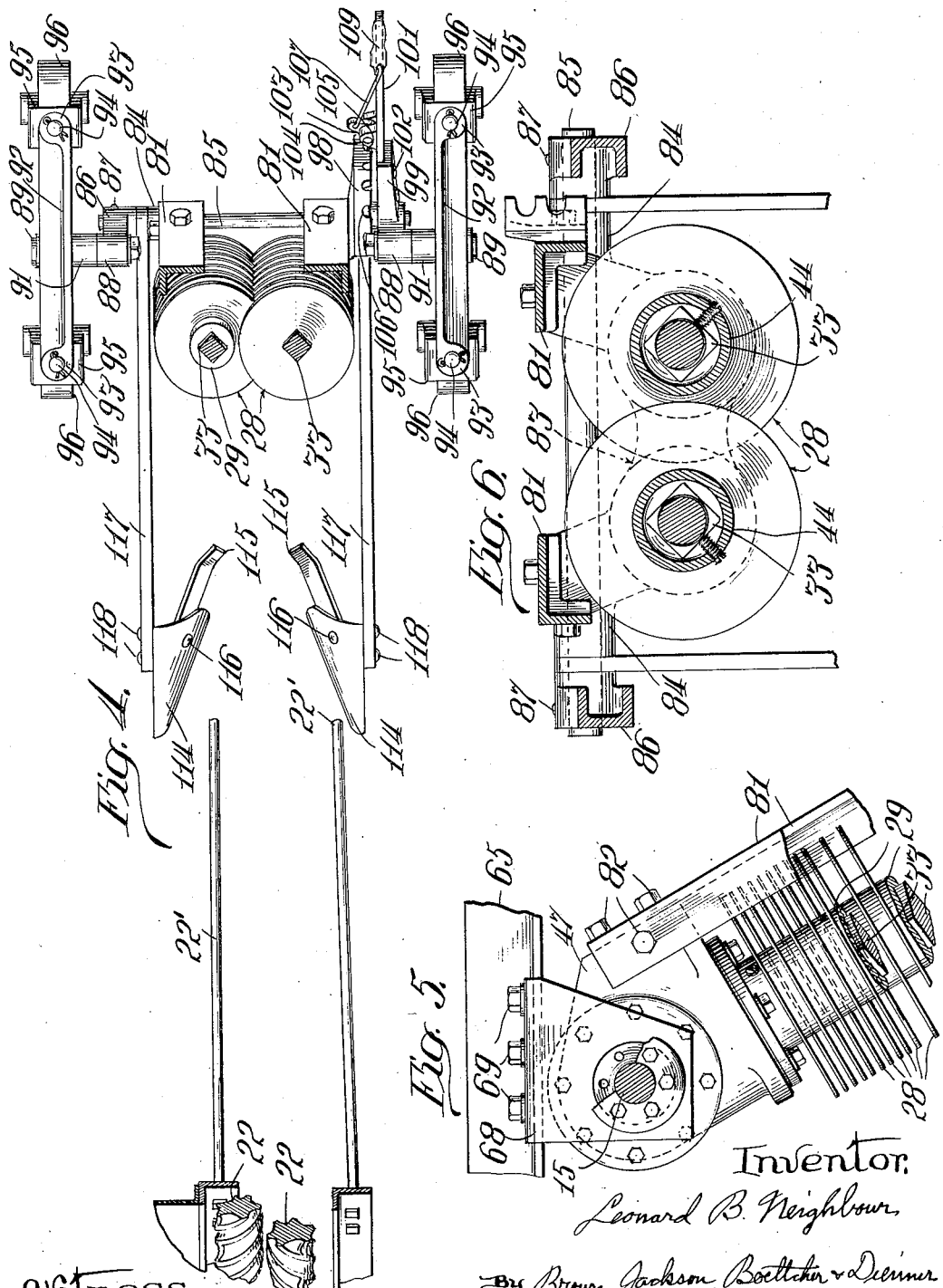

Patented Jan. 17, 1933

1,894,412

UNITED STATES PATENT OFFICE

LEONARD B. NEIGHBOUR, OF MOLINE, ILLINOIS, ASSIGNOR TO DEERE & COMPANY, OF MOLINE, ILLINOIS, A CORPORATION OF ILLINOIS

STALK SHREDDING IMPLEMENT

Application filed June 13, 1928. Serial No. 284,904.

This invention relates to a stalk shredding implement, and more particularly to shredding mechanism adapted to be associated with a vehicle and drawn through the field containing the standing stalks to be shredded.

The object of this invention is to provide a device of the above-identified character, which is adapted to be moved along a row of stalks to be shredded and comprising sets of saws, each set being made up of a plurality of closely associated saws and with the saws of one set overlapping those of the other set, so that stalks encountered will be thoroughly and completely shredded and cut into fine pieces.

Another object of this invention is to provide a stalk shredding device which may be employed as a field ensilage cutter and, in which case, it shreds and cuts the corn stalks, together with the ears of corn thereon, or it may be employed as a means of cutting the corn stalks into fine pieces and preparing them in condition to be plowed into the soil, in which case it would, preferably, be associated with a corn picker of any well-known construction.

It is a well-known fact that, in comparatively recent years, the insect known as the corn borer and that known as the cotton boll-weevil have become a great menace to agricultural districts. The most effective manner of combating these insects appears to be to destroy the stalks in which they live, by completely cutting them to pieces and into such small pieces that every insect therein will be killed. By the use of my improved corn stalk shredding implement, stalks, of whatever character that may be encountered thereby, will be cut and shredded into pieces down to approximately three-eighths of an inch or smaller, thereby effectively destroying the aforesaid insects and, at the same time, preparing the stalks in such a manner that they may be plowed into the soil as fertilizer.

In combating the corn borer, a saving of time and expense is effected by shredding or disintegrating the stalks at the same time that the ears are picked, and to this end, it is also one of the objects of the invention to provide a combination corn picking and stalk shredding implement which will perform both operations in the travel of the implement along the corn row. In such implement, the stalks may be shredded and collected in a suitable receptacle so that the machine serves as a field ensilage cutter, or they may be disintegrated and dropped upon the ground so that they can be plowed under in a later operation. Some of the features of this combined picking and shredding implement are the manner in which the shredding saws are driven; and the manner in which the saws are supported so that they will shred the stalks down to a point in close proximity to the ground, and preferably so that they will have independent floating support on the ground along the corn row and can thereby rise and fall directly with the uneven surface of the ground.

In order that others may understand my invention, I have shown, in the accompanying drawings, a preferred embodiment of the above described corn picking and stalk shredding implement.

In the drawings:

Figure 1 is a plan view of the implement being drawn by a tractor;

Figure 2 is a left side elevation of that shown in Figure 1;

Figure 3 is a sectional view, taken on the line 3—3 of Figure 2;

Figure 4 is a sectional view, taken on the line 4—4 of Figure 2;

Figure 5 is a fragmentary elevation of one side of that shown in Figure 3;

Figure 6 is a sectional view, taken on the line 6—6 of Figure 3;

Figure 7 is a perspective view of one of the saws, incorporated in my invention; and Figure 8 is a perspective view of a spacing washer used between the saws.

In Figure 1, is illustrated a corn picker, designated generally by numeral 5, and the same is provided with a composite draw-bar 6 arranged to be engaged and drawn by a draw-bar 7 of a tractor 8 which is of any suitable type and only fragmentarily shown in the drawings. A power take-off 9 leads from the tractor to suitable coupling means and drive shaft to the coupler 11 on the right side of the stalk shredding device. The coupler 11 comprises semi-circular castings 12 and 13 splined on shafts 14 and 15, respectively. Such castings are oppositely disposed and operatively secured together by means of flexible disc members 16, secured to said castings by means of bolts 17, as best illustrated in Figure 3.

The corn picker 5, illustrated in Figures 1 and 2, comprises a suitable frame structure 18, supported by wheels 19 for movement through the corn field and along the rows of corns to be picked. Suitable shoes 21 are arranged to pass each side of the row of corn and guide the stalks toward and in between the picking rolls 22, which remove the ears from the stalks. A yoke member 23 is provided for bending the taller stalks forwardly as they pass through the rolls 22, thereby insuring that the entire length of the stalk will pass between the rolls and clogging at the rear end of the rolls will be prevented. A conveyor 24 receives the ears from the picking rolls and conveys them to a suitable husking arrangement 25, the details of which are not herein shown, as they are not a part of this invention.

The mechanism of the corn picker is preferably operated through the medium of suitable chains, gears, and shafts, operatively connected with the power take-off 9, in some such manner as illustrated in Figures 1 and 2, but as these details are not a part of this invention, the description thereof is believed to be unnecessary.

As best illustrated in Figure 3, my stalk shredding device comprises two sets of oppositely rotating saws 28. The saws of one set overlap those of the other set, in the manner illustrated, so that it is impossible for a stalk of any kind whatsoever to pass through between the two sets without becoming cut and shredded to bits.

Each set of saws is composed of a plurality of individual saws, such as illustrated in Figure 7, having an irregular shaped opening therein and being spaced apart by washers 29, such as that illustrated in perspective in Figure 8. The irregular shaped openings 31 and 32 in the saws and washers, respectively, are of such size and shape as to accurately fit on the shafts 33. The lower end of each shaft 33 is turned down to a reduced cylindrical portion 34 and is surrounded by a collar 35, arranged to be engaged by and provide a seat for the lowermost saw. The collar 35 is held into firm engagement with the lower end of the enlarged portion of the shaft, by means of a nut 36, having threaded engagement on the extreme lower portion of the shaft. Ball bearings 37 engage the collar 35 and provide easy operation of the same. A suitable packing ring 38 is fitted within a recess in the lower side of the collar 35, for preventing the escape of oil from the bearing compartment 39, the bottom of which consists of a guide plate 41, held in place by bolts 42 for protecting the ball bearings from dirt and damage.

The shafts 33 are reduced and threaded at 43, adjacent the upper end thereof and a collar 44 is fitted onto the portion 43 and extends downwardly over the upper end of the same sufficiently to engage and secure in place the upper saw 28. By this arrangement, it will be readily understood that all the intermediate saws between the ends of the shafts 33 are securely held in position. For the purpose of driving the shafts 33 in opposite directions, I have provided the same with bevel gears 45, secured thereto by keys 46'.

The gears 45 mesh with gears 46 on the shaft 15, within the housing 47 which is adapted to be filled with oil or grease for lubricating the gears and the bearings. The upper end of both shafts 33 are arranged to operate on ball bearings 48 supported within the casings 49, which are fitted through openings in the bottom of the main casing 47.

The casings 49 are provided with flanges 51 on the lower edge thereof, adapted to engage below the surrounding portion of the casing 47 and are secured thereto by suitable bolts 52 and having a gasket 53 interposed between the flange and the casing 47. Lock washers 54 may also be employed with the bolts 52 for securely holding them in place. It will be noted that the circumference of the gears 45 is slightly smaller than that of the openings through the bottom of the casing 47, so that by removing the bolts 54, the sets of saws together with their bearings and gears 45 may be removed as a unit, thereby facilitating repairs and replacement of any broken parts.

On one end of shaft 15 is mounted a flywheel 55, having a web portion 56, secured by bolts 57 to hub portions 58 and the assembly is secured to the shaft 15 by a set screw 59, as best shown in Figure 3.

The housing 47 is provided with openings in the ends thereof, arranged and adapted to receive end castings 61 which are fitted about the shaft 15 and have seated therein ball thrust bearings 62 for the gears 46.

The castings 61 may be removed from the housing by first removing the set screws 63, which hold the flanges thereof to the end 64 of the housing and after the castings are removed, the shaft 15, together with the gears 46, may be readily withdrawn through the end opening.

Shaft 15, in addition to being a driving medium for the saws 28, is a pivotal axis for the entire device. Angle bars 65 and 66 are a part of the main frame of the corn picker and brackets 67 and 68 are respectively secured to the angle bars by means of suitable bolts 69 and 71. The brackets 67 and 68 are fitted on the reduced end portions 72 of the end castings 61 and they are held in place thereon by washers 73 and bolts 74, which allow the reduced portions of the castings 61 to rotate in the brackets and also provide means by which the entire shredding device may be readily detached from the vehicle conveying it.

In order that the stalk cutting device will have the proper rigidity and remain constantly in alignment, it is provided with a frame consisting of downwardly extending angle bars 81 which are secured to the housing 47 by bolts 82, as shown in Figure 5. The lower ends of bars 81 are bolted to the bottom casting 83, from which tubular bosses or housings 84 extend. A transverse shaft 85 passes through the tubular bosses. The lower guide plates or housings 41 are formed as a part of the bottom casting 83 and it will be noted that upwardly extending flanges 41' on said housings 41 embrace depending flanges on the rotating collars 35 and prevent the entrance of dirt to the lower bearings. Angle arms 86 are fitted on to and secured to the shaft 85, by means of bolts 87, so that when the shaft 85 is rotated, the arms 86 rotate therewith, when the portions 88 of the angle arms 86 are raised and lowered.

Bolts 89 pass through the horizontal portions 88 and on the outer ends of bolts 89 are positioned journals 91 which are integral with horizontally extending angle bars 92 having cylindrical portions 93 on each end thereof adapted to receive the upper cylindrical portion of wheel forks 95. Wheels 96 are rotatably mounted between the forks 95 on suitable bearing bolts 97. In order that the saws 28 will operate above the ground at a predetermined height, I have provided a quadrant 98 on one side of the saw frame and cooperatively positioned with respect thereto is an arm 99 having a lever 101 secured thereto by bolt 102. A dog 103 is pivotally secured to the lever 101, by means of lugs 104 and bolt 105 and the same is adapted to be operatively engaged and disengaged with the notches 106 in the quadrant 98, by means of a rod 107 operatively connecting the dog 103 and the member 109 on the lever 101. By this construction, it will be noted that the shredding mechanism is secured for pivotal movement about the supporting shaft 15 and rides on a carriage having wheels 96 engaging the soil, as the contour of the soil rises and falls.

As best illustrated in Figure 4, the stalk, after passing through the picking rolls 22, will pass backwardly between the stalk guides 22' and be received between the forwardly extending shoes 114 and the stalk pick-up members 115 which direct the stalk to the saws. The shoes 114 and the members 115 are secured together by bolts 116 and they are secured as a unit to the bars 117 by means of bolts 118. The rear ends of bars 117 have openings therein through which the shaft 85 passes and they, therefore, are adapted to oscillate on the shaft 85 and permit the shoes 114 to slide freely along the soil as the shredding device proceeds.

Since stalks which are desired to be shredded by this device are, ordinarily, planted intermittently or in hills spaced apart, the utility of the fly-wheel 45 is apparent, as it tends to maintain the cutting knives or saws at a constant speed of rotation and the flexible connection 11 on the other end of shaft 15 cushions the drive to the saws and also avoids the necessity of accurate alignment between the shafts 14 and 15.

I do not wish to be limited to the details herein illustrated and described, but desire to avail myself of such variations and modifications as are embodied within the scope of the appended claims.

I claim as my invention:

1. A device of the character described, comprising in combination a vehicle, a frame for said vehicle, a stalk shredding device supported thereby, said shredding device comprising two sets of overlapping cutting discs arranged to be moved along a row of stalks to be shredded, pivotal means for securing said shredding device to said frame, and means movably carrying the lower end of said shredding device so that the shredding device may rise and fall relative to the vehicle frame in travelling over uneven ground.

2. A device of the character described, comprising in combination a vehicle, a frame for said vehicle, pivotal supporting means on said frame, a stalk shredding device supported thereby, means on the lower end of said shredding device arranged to ride on the soil and raise and lower with the variations thereof, said shredding device comprising two cooperating sets of circular cutting saws, arranged to be moved as a unit along the row of stalks to be shredded, and means for rotating said cooperating saws.

3. A device of the character described, comprising the combination with a propelling vehicle having a power take-off, of a second vehicle having a frame, pivotal supporting means on said frame, a stalk shredding implement supported thereby, said shredding implement comprising two sets of cooperating cutting saws, arranged to be moved along a row of stalks to be shredded, and means for rotating said saws from the power take-off of the propelling vehicle.

4. A corn picker comprising in combination a frame, picking rolls mounted on said frame arranged to remove ears of corn from the stalk, stalk shredding mechanism supported by said frame, said shredding mechanism comprising cooperating sets of overlapping cutting discs arranged to be moved along a row of stalks to be shredded, means for guiding stalks from said picking rolls to said shredding mechanism, supporting means for the lower end of said sets comprising members arranged to move upon the surface of the soil, and means for rotating said saws in opposite directions.

5. A corn picker comprising in combination a frame, a pivotal supporting means on said frame, picking rolls mounted on said frame arranged to remove ears of corn from the stalk, a stalk shredding mechanism secured to said pivotal supporting means, said mechanism comprising two sets of overlapping cooperating circular saws, arranged to be moved along a row of stalks to be shredded, means for supporting the lower ends of said sets and having means thereon arranged to engage and ride upon the soil, and power take-off means from a propelling vehicle arranged to operate said saws.

6. A device of the character described comprising in combination a stalk shredding mechanism, a pivotal support for said mechanism, adjustable means engaging and riding on the soil for supporting the lower end of said mechanism, said mechanism comprising two sets of saws arranged to rotate in opposite directions, the saws of one set overlapping those of the other set, each set comprising a plurality of relatively closely spaced saws arranged on a shaft for rotation therewith, bearing members for said saws, the upper bearing members of both of said sets being disposed within the same head, power means arranged for operating said saws and a fly-wheel for maintaining a constant speed of rotation.

7. A device of the character described comprising a stalk shredding mechanism arranged to be moved along a row of stalks to be shredded, pivotal supporting means for the upper end of said mechanism, a frame for said mechanism, adjustable means on the lower end of said frame arranged to ride upon the surface of the soil for moving the lower end of said mechanism up and down as the frame travels over uneven ground, said mechanism comprising two sets of cooperating cutting means, each of said sets comprising circular saws and spacing washers alternately positioned on an irregular shaft, clamping means for securing said saws in position, bearings for said shafts, a gear on the upper end of each shaft, and a drive shaft operatively connected with said gears.

8. A device of the character described comprising a stalk shredding mechanism arranged to be moved along a row of stalks to be shredded, pivotal supporting means for the upper end of said mechanism, a frame for said mechanism, adjustable means on the lower end of said frame arranged to ride upon the surface of the soil for moving the lower end of said mechanism up and down as the frame travels over uneven ground, said mechanism comprising two sets of cooperating cutting means, each of said sets comprising circular saws and spacing washers alternately positioned on an irregular shaft, clamping means for securing said saws in position, bearings for said shafts, a gear on the upper end of each shaft, a drive shaft operatively connected with said gears, and shoes and stalk pick-up devices arranged forwardly of said saws.

9. A device of the character described, comprising the combination of a vehicle having a frame, a stalk shredding device including a shredder frame pivotally supported at one end by said vehicle frame, and cooperating sets of cutting devices arranged to be moved along a row of stalks to be shredded, means for operating said cutting devices, and a fly wheel operatively connected to said cutting devices.

10. An implement of the class described, comprising the combination of a corn picker having a frame, a stalk shredding mechanism including a second frame pivoted at its upper end to the frame of the picker, and a plurality of cutters rotatably carried by said second frame, means adapted to engage and ride upon the soil for supporting the lower end of said shredder frame, and means to operate said cutters.

11. An implement of the class described, comprising the combination of a corn picker having a frame, a stalk shredding mechanism including a second frame pivoted at its upper end to the frame of the picker, and a plurality of cutters rotatably carried by said second frame, means including rollers adapted to engage and ride upon the soil for supporting the lower end of said shredder frame, and means to operate said cutters.

12. An implement of the class described, comprising the combination of a corn picker having a frame, a stalk shredding mechanism including a second frame pivoted at its upper end to the frame of the picker, and a plurality of cutters rotatably carried by said second frame, means including a carriage adapted to engage and ride upon the soil for supporting the lower end of said shredder frame, means for adjusting the position of the shredder frame on said carriage whereby the distance between the soil and the cutters may be regulated, and means to operate said cutters.

13. An implement of the class described, comprising the combination of a corn picker having a frame, a stalk shredding mechanism including a second frame pivoted at its upper end to the frame of the picker, and a plurality of cutters rotatably carried by said second frame, means for floatingly supporting the lower end of the shredder frame upon the soil, and means for operating the cutters.

14. An implement of the class described, comprising the combination of a corn picker having a frame, a stalk shredding mechanism including a second frame pivoted at its upper end to the frame of the picker, and a plurality of cutters rotatably carried by said second frame, means for floatingly supporting the lower end of the shredder frame upon the soil, means for adjusting the position of the cutters on said supporting means whereby the distance between the cutters and the soil may be regulated, and means for operating the cutters.

15. An implement of the class described, comprising the combination of a corn picker having a frame, a stalk shredding mechanism including a second frame pivoted at its upper end to the frame of the picker, and a plurality of cutters rotatably carried by said second frame, means for floatingly supporting the lower end of the shredder frame upon the soil, means projecting forwardly from and carried by said supporting means to guide the stalks to said cutters, and means for operating the cutters.

16. An agricultural implement comprising a wheel supported frame, a second frame pivotally supported near its upper end on said first named frame and movable with respect thereto, a stalk cutting device supported on the second frame and comprising cutting devices rotatably mounted in the second frame and arranged to move along a row of plants to be cut, and means for operating the cutting devices.

17. An agricultural implement comprising, in combination, a vehicle having a wheeled frame, a pivotal supporting means journaled near its upper end on said frame, a stalk cutting implement supported by said journaled supporting means, said cutting implement comprising sets of cooperating cutting elements, arranged to be moved along a row of stalks to be cut, means to drive said elements including a transverse shaft disposed coincident with the journal axis of said pivotal supporting means, and a power take-off from a propelling vehicle arranged to rotate said shafts.

18. An agricultural implement comprising, in combination, a corn picker having a frame and picking mechanism thereon, and stalk cutting mechanism including a second stalk cutting mechanism movably supported with respect to the picker frame and a stalk cutting element carried by said second device.

19. An agricultural implement comprising, in combination, a vehicle, a frame for said vehicle, and a stalk cutting device pivotally supported thereby, said device comprising cooperating cutting devices arranged to move along a row of stalks to be cut and means for adjusting the height of said device relative to the ground.

20. An agricultural implement comprising, in combination, a vehicle having a frame, a stalk cutting device supported by said frame, said cutting device comprising a set of rotating cutting knives arranged to be moved along a row of stalks to be cut, the axis of rotation of said knives extending downwardly and rearwardly with respect to the direction of travel of the vehicle, and means for guiding stalks toward said cutting device.

21. A device of the character described, comprising the combination of a vehicle having a frame, a stalk cutting device including a cutter frame pivotally supported at one end by said vehicle frame, a shaft, cutting devices arranged on said shaft and adapted to be moved along a row of stalks to sever portions from the stalks, and means for operating said cutting devices including a transverse shaft and bevel gear connections between said transverse shaft and the upper end of said first named shaft.

22. A machine of the class described comprising, in combination, a wheeled frame, a stalk cutter mounted at its forward end on the frame and adapted to swing in a longitudinal plane, said stalk cutter including a series of cutting elements each adapted to sever the stalk and to rotate in a plane inclined to the normal position of the standing stalk, and means connected with the lower end of said cutter for raising the cutter relative to the ground.

23. An agricultural implement comprising a tractor propelled frame adapted to pass down the row of stalks, a shaft journaled for rotation in the frame, a second frame pivotally connected at its upper end to the wheeled frame for movement about an axis coincident with the axis of said shaft, means for driving said shaft from the power take-off of the tractor, a second shaft extending in a generally upwardly direction, a bevel gear on the uper end of said second shaft, a companion bevel gear meshing therewith and carried by said first shaft, and a plurality of stalk cutting elements carried by said second shaft.

24. An agricultural implement comprising a wheeled supporting frame, stalk cutting means pivoted at one end to said frame, means for supporting the other end of said cutting means on the ground, the lower end of the cutting means being thereby permitted to rise and fall in traveling over uneven ground, and means for raising said other end of the cutting means.

25. An implement of the class described, comprising a wheeled frame, stalk cutting mechanism including a second frame pivoted at one end with respect to said first frame and a plurality of cutting elements carried by the second frame, the force of gravity acting to hold the lower end of said second frame close to the ground, means for driving the cutting elements, and means for guiding stalks to the cutting mechanism.

26. A device of the character described, comprising the combination with a propelling vehicle having a power take-off of a second vehicle having a frame, pivotal supporting means on said frame, a stalk cutting implement supported thereby, said cutting implement comprising cooperating cutting elements arranged to be moved along a row of stalks to be shredded, and means for rotating said elements from the power take-off of the propelling vehicle.

27. An agricultural implement comprising a wheel supported frame, a second frame including a housing at the upper end thereof pivotally supported on said first named frame, a stalk cutting device supported on the second frame and having one end journaled in said housing, and driving connections for said cutting device including gear means disposed in said pivotally supported housing.

28. An agricultural implement comprising, in combination, a wheeled frame, a transversely disposed housing, bearing means supporting said housing on said frame, a second frame supported at its upper end by said housing, a shaft having its upper end journaled in said housing, cutting devices carried by said shaft, means for driving said shaft including a second shaft journaled for rotation by said bearing means coincident with the axis of said housing, connections between said shafts disposed in said housing, and means for raising the lower end of said second frame.

29. An agricultural implement comprising, in combination, a wheeled frame, spaced bearings on said wheeled frame, a housing pivotally supported in said bearings, a second frame fixed to said housing, a generally upwardly extending shaft having its lower end journaled in the second frame and its upper end journaled in said housing, a power shaft supported for rotation in said bearings, and a pair of bevel gears disposed in said housing and connecting said shafts, said second frame and housing being movable about its transverse axis coincident with the axis of rotation of the power shaft.

30. An agricultural machine of the class described comprising, in combination, a wheeled frame, a cutter frame including an upper transverse housing and a downwardly extending framework, upper and lower bearings on said cutter frame, a rotatable shaft journaled in said bearings and carrying a plurality of stalk cutting elements, said rotatable shaft extending into said housing, and means in said housing for driving said shaft.

In witness whereof, I hereunto subscribe my name this 8th day of June, 1928.

LEONARD B. NEIGHBOUR.